(12) United States Patent
Qin et al.

(10) Patent No.: US 9,453,571 B2
(45) Date of Patent: Sep. 27, 2016

(54) METAL PULLEY WITH NON-MAGNETICALLY SUSCEPTIBLE INSERT

(71) Applicant: BorgWarner Inc., Auburn Hills, MI (US)

(72) Inventors: Shiwei Qin, Battle Creek, MI (US); James Ignatovich, Ceresco, MI (US)

(73) Assignee: BorgWarner Inc., Auburn Hills, MI (US)

( * ) Notice: Subject to any disclaimer, the term of this patent is extended or adjusted under 35 U.S.C. 154(b) by 228 days.

(21) Appl. No.: 14/149,713

(22) Filed: Jan. 7, 2014

(65) Prior Publication Data

US 2014/0179476 A1 Jun. 26, 2014

Related U.S. Application Data

(63) Continuation-in-part of application No. 14/135,280, filed on Dec. 19, 2013.

(60) Provisional application No. 61/745,647, filed on Dec. 24, 2012.

(51) Int. Cl.
*F16D 13/44* (2006.01)
*F16H 55/44* (2006.01)

(52) U.S. Cl.
CPC .................................. *F16H 55/44* (2013.01)

(58) Field of Classification Search
CPC ...... F16H 55/44; F16D 54/44; F16D 27/112; F16D 13/76; F16D 2500/504; F16D 2500/5041
See application file for complete search history.

(56) References Cited

U.S. PATENT DOCUMENTS

| | | | |
|---|---|---|---|
| 2,991,864 A | 7/1961 | Prachar | |
| 5,057,728 A | 10/1991 | Dammeyer et al. | |
| 5,295,812 A | 3/1994 | Steele | |
| 5,551,546 A | 9/1996 | Tabayama et al. | |
| 5,984,068 A | 11/1999 | Reed, Jr. | |
| 6,071,205 A * | 6/2000 | Ohno | F16H 55/44 29/892.3 |
| 6,119,841 A | 9/2000 | Orlamunder | |
| 6,488,133 B1 | 12/2002 | Maurice et al. | |
| 6,561,336 B1 | 5/2003 | Huart et al. | |
| 6,868,809 B1 | 3/2005 | Robb | |
| 6,974,010 B2 | 12/2005 | Machida et al. | |
| RE39,795 E | 8/2007 | Wright | |
| 7,267,214 B2 | 9/2007 | Bittner et al. | |

(Continued)

FOREIGN PATENT DOCUMENTS

| | | |
|---|---|---|
| CN | 201721321 U | 1/2011 |
| CN | 102085801 A | 6/2011 |
| WO | WO-2012/142016 A2 | 10/2012 |

*Primary Examiner* — David J Hlavka
(74) *Attorney, Agent, or Firm* — Harness, Dickey & Pierce, P.L.C.; John A. Artz, PC

(57) ABSTRACT

A pulley member, particularly for an electromagnetically controlled friction clutch in an accessory drive assembly. The pulley member has two mating metal cup members bonded together with a central hub member. Through-hole slots or openings are provided in each of the cup members to provide a break in magnetic flux. A non-magnetic insert member is positioned between the cup members covering the through-holes and sealing them from contamination from environmental factors. The pulley member can be used with vehicle engine accessories such as water pumps and cooling fans.

19 Claims, 7 Drawing Sheets

(56) References Cited

U.S. PATENT DOCUMENTS

| | | |
|---|---|---|
| 7,841,456 B2 | 11/2010 | Pescheck et al. |
| 8,256,598 B2 | 9/2012 | Buzzard |
| 8,371,426 B2 | 2/2013 | Hoshino et al. |
| 8,678,152 B2 | 3/2014 | Kuwabara |
| 8,851,258 B2 | 10/2014 | Komorowski et al. |
| 8,978,600 B2 | 3/2015 | Shutty et al. |
| 9,004,251 B2 | 4/2015 | Ikegawa |
| 9,140,313 B2 | 9/2015 | Ikegawa |
| 9,217,476 B2 | 12/2015 | Roby |
| 9,279,460 B2 | 3/2016 | Qin |
| 2002/0108588 A1 | 8/2002 | Komorowski |
| 2003/0008741 A1* | 1/2003 | Fadler ............... F16H 55/44 474/174 |
| 2003/0029392 A1 | 2/2003 | Komorowski |
| 2003/0029393 A1 | 2/2003 | Komorowski |
| 2007/0227853 A1* | 10/2007 | Pardee ............ F16D 27/112 192/84.961 |
| 2009/0047162 A1* | 2/2009 | Uchikado ......... F04B 27/0895 418/69 |
| 2009/0272615 A1 | 11/2009 | Buzzard |
| 2010/0126822 A1 | 5/2010 | Winkler et al. |
| 2012/0133465 A1 | 5/2012 | Staniewicz et al. |
| 2013/0075219 A1* | 3/2013 | Onitake ............ F16D 27/112 192/84.9 |
| 2013/0093547 A1 | 4/2013 | Staniewicz et al. |
| 2013/0098730 A1 | 4/2013 | Danciu et al. |
| 2013/0175134 A1 | 7/2013 | Boyes et al. |
| 2013/0187736 A1 | 7/2013 | Staniewicz et al. |
| 2013/0306005 A1 | 11/2013 | Shutty et al. |
| 2013/0313068 A1 | 11/2013 | Mevissen et al. |
| 2014/0023526 A1 | 1/2014 | Roby |
| 2014/0076683 A1 | 3/2014 | Williams |
| 2014/0141892 A1 | 5/2014 | Williams |
| 2014/0174873 A1 | 6/2014 | Qin |
| 2014/0174874 A1 | 6/2014 | Qin |
| 2014/0238809 A1 | 8/2014 | Boyes et al. |
| 2015/0075935 A1* | 3/2015 | Kitayama ......... F16D 27/112 192/45.004 |
| 2015/0184575 A1 | 7/2015 | Shutty et al. |
| 2015/0285365 A1 | 10/2015 | Canto Michelotti |
| 2016/0040733 A1 | 2/2016 | Staniewicz et al. |

* cited by examiner

METAL PULLEY WITH NON-MAGNETICALLY SUSCEPTIBLE INSERT

CROSS-REFERENCE TO RELATED APPLICATIONS

This application is a continuation-in-part of U.S. patent application Ser. No. 14/135,280 filed on Dec. 19, 2013, which claims the benefit of U.S. Provisional Patent Application Ser. No. 61/745,647, filed on Dec. 24, 2012.

TECHNICAL FIELD

The present invention relates to pulley members used with vehicle engines, and more particularly pulley members which are a component in an electromagnetic circuit.

BACKGROUND OF THE INVENTION

There are numerous accessory components and systems utilized with vehicle engines today. Many of these accessories are driven or operated by a serpentine belt driven directly or indirectly by the crankshaft of the engine. A pulley member is typically included on, or in connection with, the accessory and used in cooperation with the belt to drive or operate the accessory. Accessories of this type include air conditioning compressors, cooling fans, water pumps, alternators and the like.

Pulleys driven by engine belt members are typically included in fan drive assemblies and water pump drives, which may also include friction clutch assemblies or viscous drive assemblies. These clutch and drive assemblies typically have internal mechanisms or components which regulate or control the operation of the accessories relative to the input speed of the engine from the belt and pulley mechanism.

Some of these accessory drive assemblies have internal electromagnetic clutch mechanisms or systems which control the engagement of the fan drives and thus control the speed of the fan. Control systems based, for example, on sensor input, can be utilized to control the operation of the electromagnetic clutch or drive system.

In the electromagnetic systems of such accessory drives, the pulley member, or portions thereof, can be positioned in the electromagnetic flux circuitry as part of a clutch activation or deactivation system. It thus is important to position and structure the pulley and pulley assembly in an appropriate manner. Also, since the pulley members can be exposed to outside environment factors in the engine compartment of the vehicles, it is important to protect and seal the internal components of the accessory drives from a leakage or entry of debris, water, oils and other environmental factors through the pulleys.

It is an object of the present invention to provide an improved pulley operated accessory drive mechanism which is protected from ingress of harmful environment matters. It is also an object to provide an improved pulley member and mechanism for use in water pump and fan drive assemblies, particularly those which utilize electromagnetic clutch mechanisms.

SUMMARY OF THE INVENTION

An improved pulley member is provided which can be used in an accessory drive assembly, particularly for a water pump assembly or a fan drive mechanism. The pulley member is preferably made of a magnetic material and has a plurality of components which are securely bonded together, such as by welding. The pulley member provides a sealed product which protects the internal components of the accessory drive from outside environmental factors. In one form, the present teachings provide a pulley that includes first and second metal CUP members and at least one non-magnetically susceptible insert member. The first metal CUP member has a plurality of first openings and the second metal CUP member has a plurality of second openings. The first and second openings are at least partly axially and radially aligned to create one or more overlap area where the first and second openings overlap. The one or more non-magnetically susceptible insert member(s) is/are positioned between the first and second CUP members and cover the one or more overlap areas.

In another form, the present teachings provide a driven vehicle accessory that includes a shaft member, a pulley and an electronic clutch. The shaft member and the pulley are rotatable about an axis. The electronic clutch has an armature and an electromagnetic coil that is selectively operable for generating a magnetic field to move the armature between a first armature position and a second armature position. The electronic clutch transmits rotary power between the pulley and the shaft member when the armature is in the first armature position. The electronic clutch does not transmit rotary power between the pulley and the shaft member when the armature is in the second armature position. The pulley that includes first and second metal CUP members and at least one non-magnetically susceptible insert member. The first metal CUP member has a plurality of first openings and the second metal cup member has a plurality of second openings. The first and second openings are at least partly axially and radially aligned to create one or more overlap area where the first and second openings overlap. The one or more non-magnetically susceptible insert member(s) is/are positioned between the first and second CUP members and cover the one or more overlap areas.

Other benefits and features of the present invention will become apparent from the following detailed description of the invention, the attached drawings, and the appended claims.

BRIEF DESCRIPTION OF THE DRAWINGS

FIGS. 6, 7, 7A, 8 and 9 schematically depict an accessory drive for a water pump in which an embodiment of the present invention is utilized.

DETAILED DESCRIPTION OF THE PREFERRED EMBODIMENT

Figure 1:
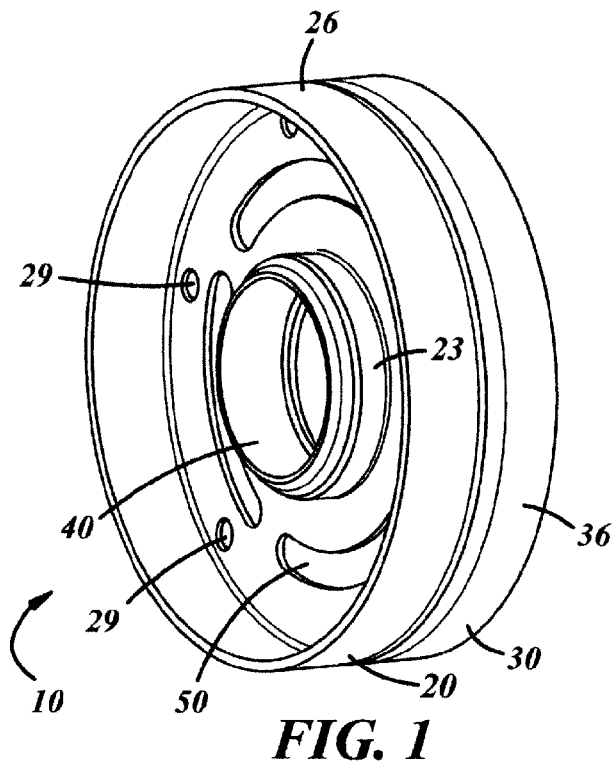
FIG. 1 is a schematic perspective view of an embodiment of a pulley member in accordance with the present invention.
Figure 3:
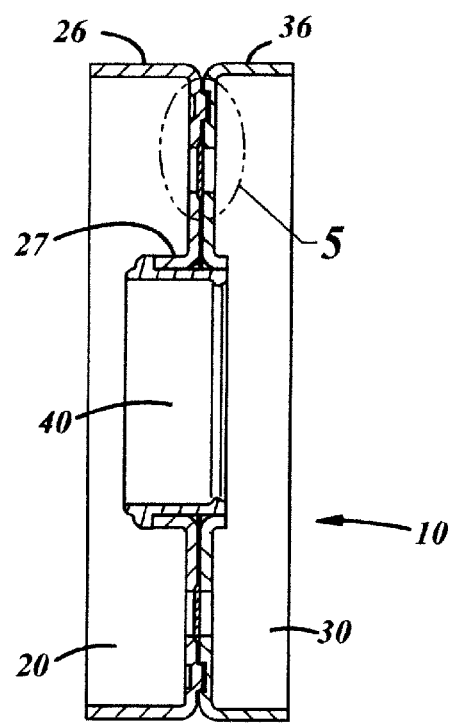
FIG. 3 is a cross-sectional view of the pulley member taken along lines 3-3 in FIG. 2.
Figure 2:
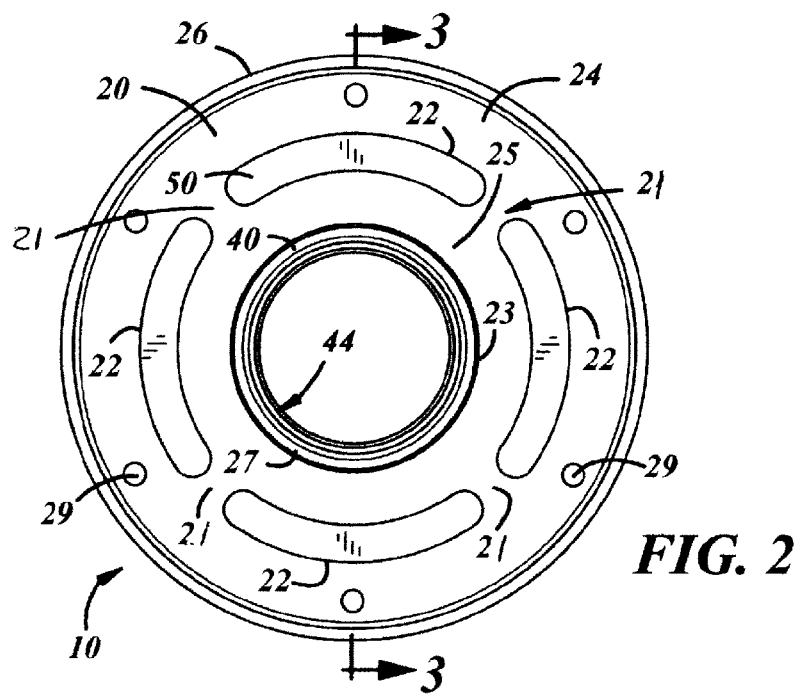
FIG. 2 is a planar view of the pulley member of FIG. 1.

A preferred embodiment of the inventive pulley member is schematically depicted in FIGS. 1-5 and referred to by numeral 10. The pulley member 10 has a first cup member 20, a second cup member 30, a central hub member 40, and an insert member 50.

The cup members 20 and 30, as well as the hub member 40, are preferably made of magnetic materials, such as low carbon steel. If the pulley member is adapted for placement in a magnetic flux of an electromagnetic circuit, the cup members should be made from a magnetically susceptible material.

The cup member 20 has a plurality of openings or curved slots 22 separating the outer annular ring portion 24 of the cup member from the inner annular ring portion 25 of the cup member. The slots create openings in the cup member. Four arc-shaped slots 22 are shown in the Figures. The size, shape, and number of openings or slots 22 are not critical, so long as the openings are sufficient to create a break in any magnetic flux flowing through the two annular ring portions 24 and 25. Small or thin land areas 21 are positioned between the slots in order to maintain structural continuity and integrity between the two annular ring portions 24 and 25.

The cup member 20 also has an external annular flange member 26 and an inner annular flange or rim member 23. The external flange member 26 mates with the corresponding external flange member 36 on cup member 30 to form a surface for positioning of an engine belt thereon. In this regard, although the outer surface of the flange members 26 and 36 are depicted as being flat and planar, the outer surfaces could have ridges, saw-teeth, or any other conventional surface, for mating with a vehicle accessory drive belt.

The inner annular flange or rim member 23 is used to mate with a mating annular member 42 on the hub member 40 in order to position the two components properly in place during assembly.

The shape, configuration and structure of cup members 30 are the same as for cup member 20. The cup member 30 has a plurality of slot openings 32 separating an outer annular ring portion 34 from an inner annular ring portion 35. Since the cup members 20 and 30 are formed to mate and work together to form the pulley member 10, the number of slots 32, as well as their size, shape and positioning, are the same as the slot openings 22 in the cup member 20. Thus, when the two cup members are assembled together, the slot openings are aligned and form the break in the magnetic flux.

In order to assist in properly aligning and positioning the two cup members 20 and 30 together during assembly, a plurality of mating nub members and recess members are provided. The nub members protrude from the mating surface of one of the cup members and are positioned in mating recesses in the mating surface of the other cup members. The size, shape, locations and number of nub and recess members are not critical, although at least 2 or 3 mating sets are preferably provided. Other conventional types of aligning systems within the ordinary skill of artisans in the field could also be utilized to properly mate and align the two cup members together.

In the preferred embodiment shown in the drawings, a plurality of nub members 28 are provided in cup member 20 (see FIGS. 4 and 5) and a similar number of mating recesses 38 are provided in cup member 30. Since the nub members typically are formed from the inner surface side of the cup member 20 and protrude from the opposite mating surface, depressions 29 are typically formed on the inner surface.

When the nubs and recesses are formed, or with any other equivalent alignment system, it is preferred that through-holes or openings completely through the cup members are not created. Additional openings in the cup members could create unwanted inlets for environmental contamination into the accessory drive. If any through holes are formed, they preferably should be covered in some manner in order to prevent contamination from the environment.

The hub member 40 has a cylindrical shape as shown in the drawings with an external shoulder flange 42 and a central opening 44. The opening 44 is used for mounting the pulley member 40 on a bearing or other component of the accessory drive.

The insert member 50 is made from a non-magnetically susceptible material, such as stainless steel. The insert member 50 has a size and shape sufficient to cover and seal the through openings formed by the mating slot openings 22 and 32. During assembly, the insert member 50 is positioned between the mating surfaces of the two cup members 20 and 30. This is shown in particular in FIG. 5.

In order to position and align the insert member between the two cup members, recesses 27 can be provided around each of the slot openings 22 in cup member 20. The land areas 26 between the slot openings also are recessed for the same purpose. It is also possible to provide individual insert members to cover and seal each of the through-holes in the pulley member 10.

Figure 4:
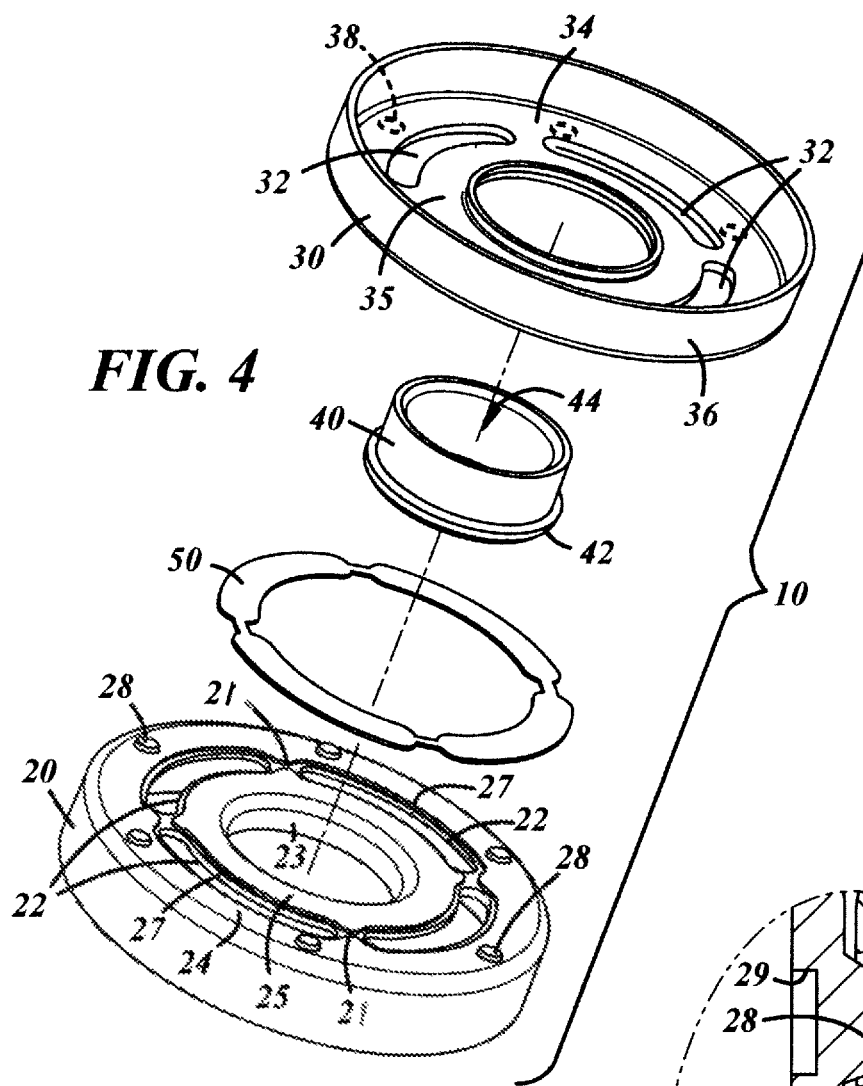
FIG. 4 is an exploded view of the pulley member as depicted in the other Figures.
Figure 5:
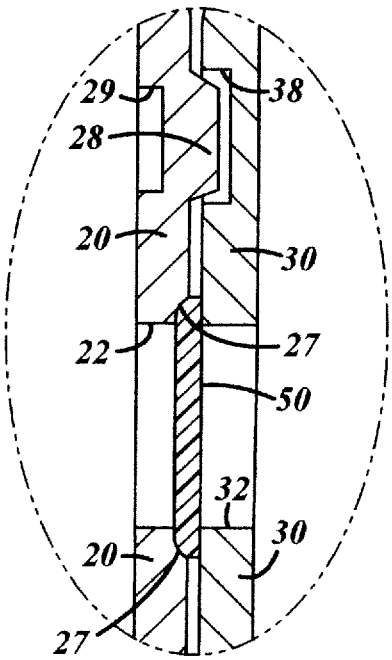
FIG. 5 is an enlarged view of a portion of the cross-sectional view of FIG. 3.

The insert member 50 shown in the drawings, particularly in FIG. 4, as utilized with a preferred embodiment of the invention, has an annular shape and is formed to cover and block the through-openings between the two cup members over each area where the through-openings overlap. The insert member is preferably a thin sheet or piece of non-magnetically susceptible material. The insert member also could be a larger or more solid annular shaped member, or of any size to cover the through openings and fulfill its purpose. Considerations of cost and ease of placement and alignment could be factors in selecting the size and shape of the insert member, as well as its number of pieces.

The insert member could also be called a gasket member and could be made of any non-metallic material.

After the two cup members 20, 30, insert member 50, and hub member 40 are assembled together, they are fixedly bonded together, such as by welding. If through holes rather than recesses are provided in cup member 30, the welding could take place in each of the holes and at the ends of the hub member.

The through-hole openings in the pulley member 10 create a break in the magnetic flux in the pulley. The pulley is preferably part of a clutch system and needs to be sealed from contamination in the environment. The non-magnetically susceptible insert seals the through-like openings while maintaining the function of the pulley in a magnetic flux circuit.

Figure 6:
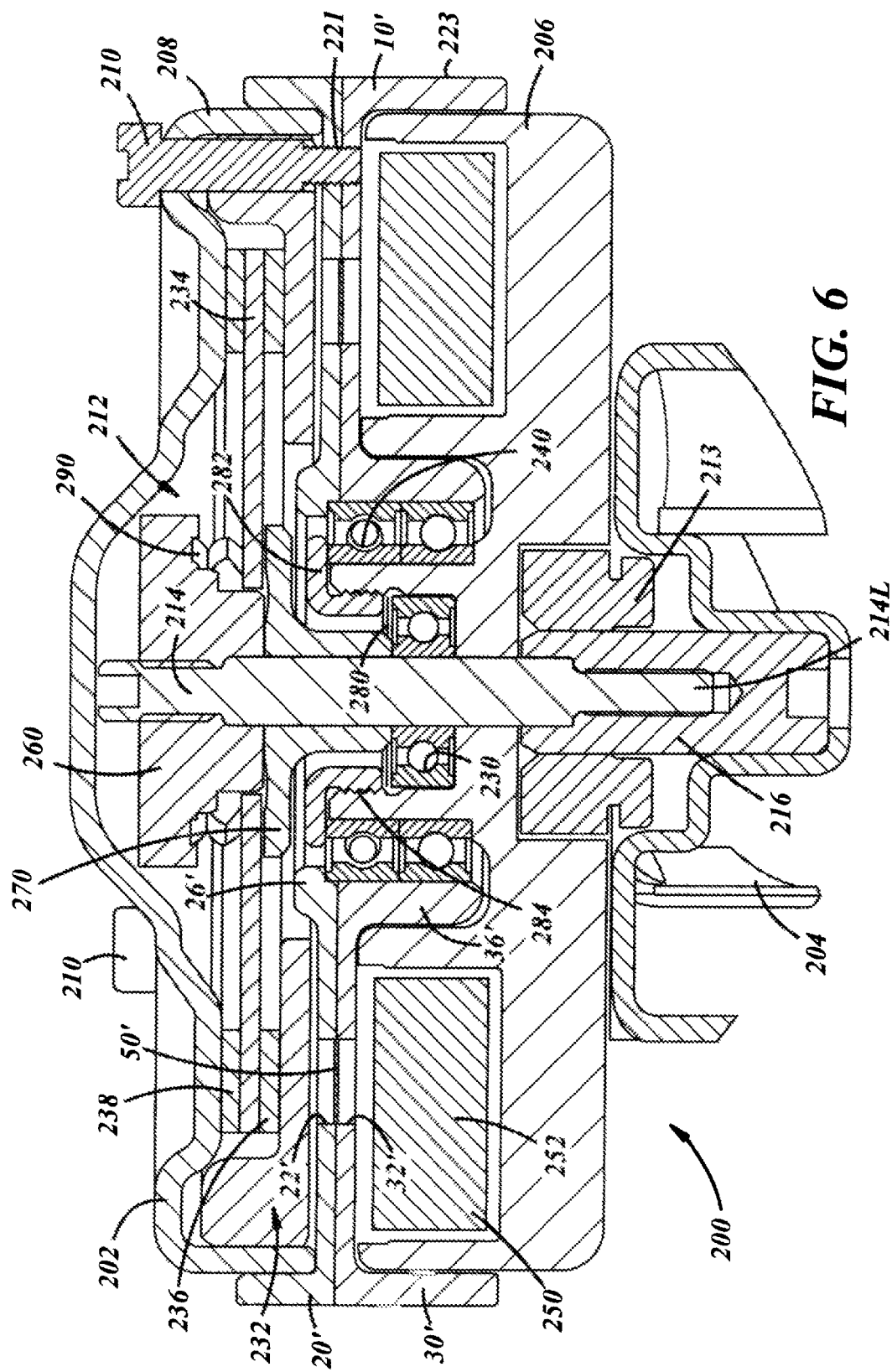
Figure 7:
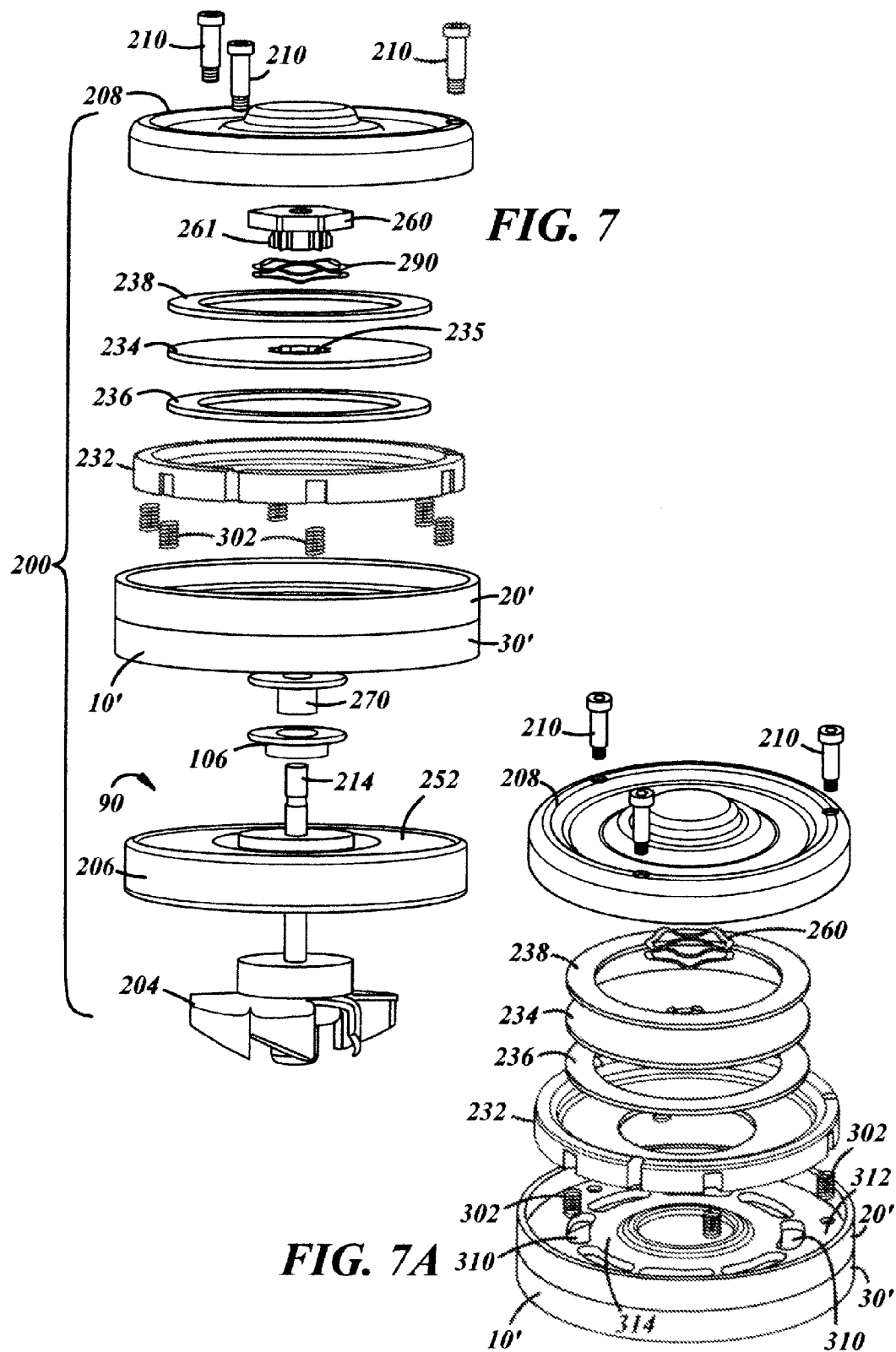

FIGS. 6 and 7 depict the water pump accessory drive with an electromagnetic control mechanism. This is an environment in which the present pulley invention could be utilized.

For purposes of the present description, the features, components and operation of the accessory drive need only be summarized and briefly described. A fuller description of the drive is contained in pending U.S. Application Ser. No. 61/745,647, the disclosure of which is hereby fully incorporated by reference herein.

An accessory assembly embodiment used to operate a cooling pump is shown in FIGS. 6, 7, 7A, 8 and 9. It is generally referred to by the reference numeral 200. The assembly includes a housing 202 and an impeller 204 which is used to circulate the engine cooling fluid in the vehicle. An embodiment of the inventive pulley member is also included in this assembly 200 and referred to by the reference numeral 10'.

The housing 202 includes a base member 206, a cover member 208, and a pulley member 10'. The cover and pulley can be secured together by a plurality of fasteners, such as bolts 210. A solenoid actuated friction clutch mechanism 212 is positioned in the housing. A central shaft member 214 is positioned centrally in the housing and is used to rotate the impeller 204. The impeller is positioned in a housing (not shown) and is connected to the shaft member 214 by a fitting member 216. The lower end 214L of the shaft is secured to the fitting members 216 in any conventional manner. Seal member 213 is also provided.

The pulley member 10' is adapted to be driven by an engine belt, either directly or indirectly by the engine crankshaft. Although the outside surface 223 of the pulley member is smooth in the drawings, it can have any conventional shape in order to mesh with the engine belt.

The pulley member 10' is an embodiment of the pulley member invention and is an alternative to the pulley member 10 described above and shown in FIGS. 1-5. The pulley member 10' has a first metal cup member 20' which is substantially the same as cup member 20 described above, but which has a flange member 26' which differs in size and shape from flange member 26. The pulley member 10' also has a second metal cup member 30' which is substantially the same as cup member 30 described above, but which has a flange member 36' which differs in size and shape from flange member 36.

Figure 8:
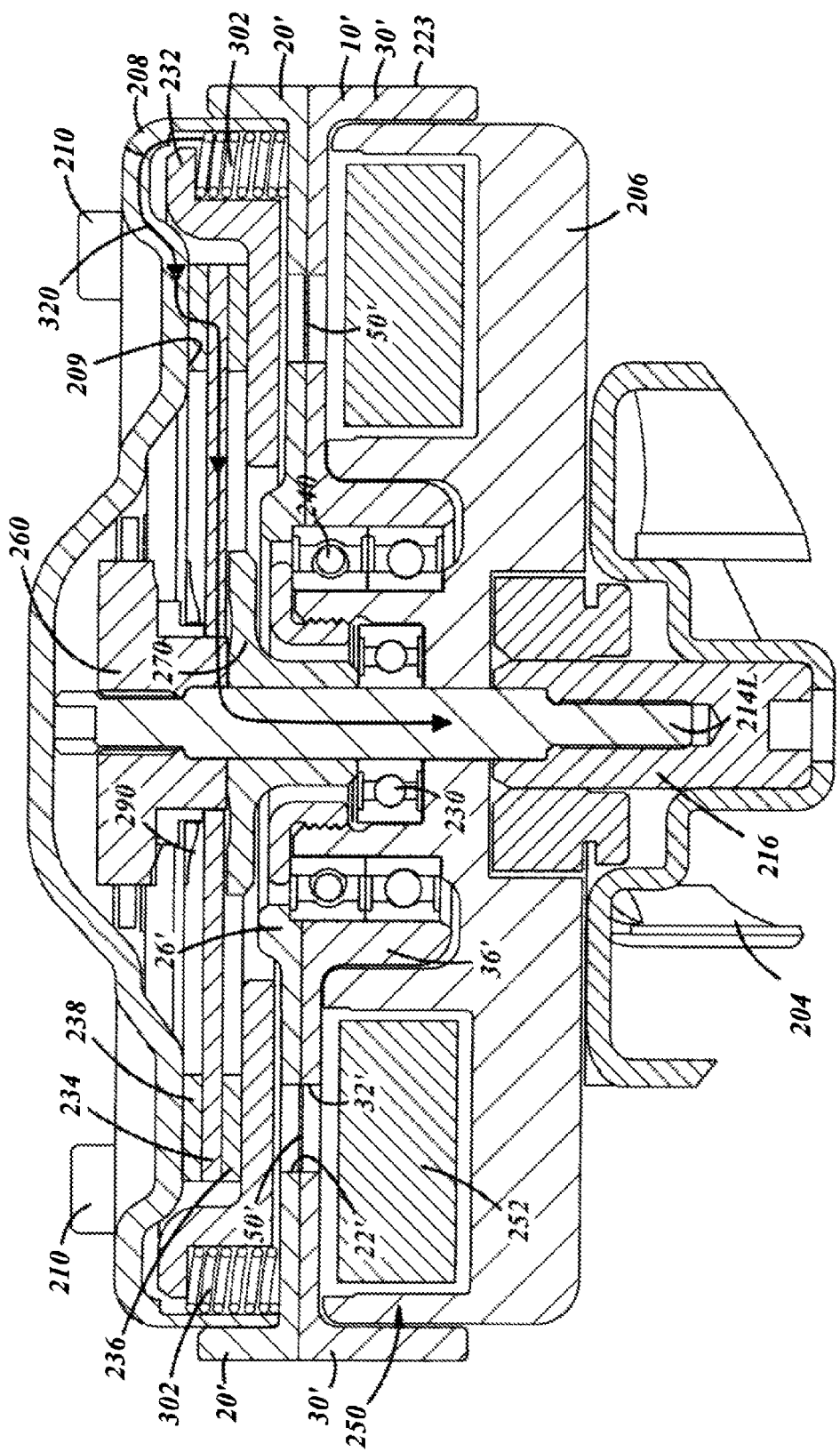
Figure 9:
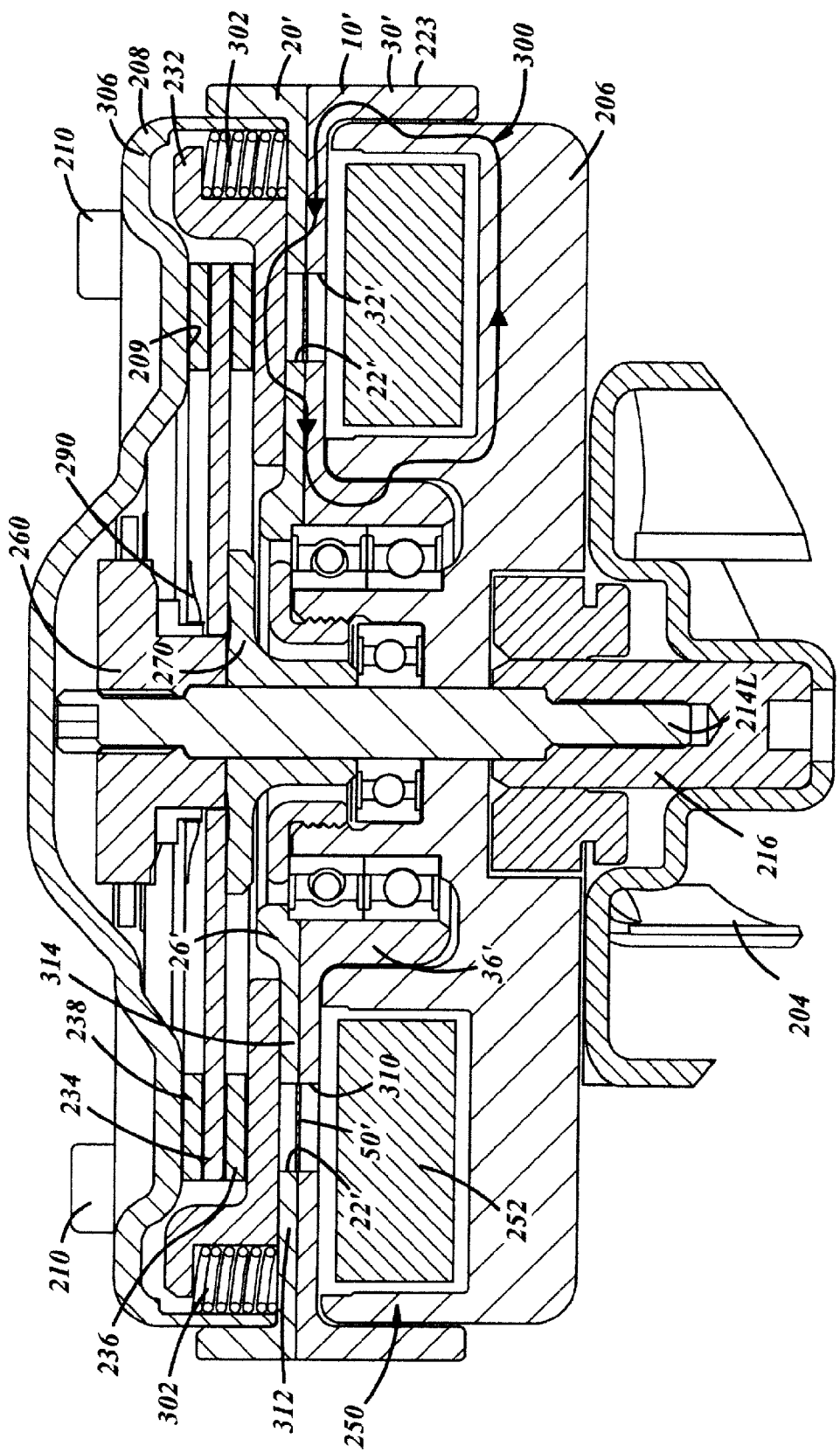

The pulley member 10' also has a non-magnetically susceptible insert member 50' which is the same as insert member 50 described above. The insert member is positioned between openings 22' and 32' which are substantially the same as openings 22 and 32 described above. As shown in FIGS. 6, 8 and 9, the matching openings 22' and 32' provide through holes through the pulley member 10'.

A hub member, such as hub member 40 described above, is not needed for this embodiment.

The two cup members 20' and 30' are bonded together, preferably by welding, with the insert member 50' between them. This is the same as the bonding together of cup members 20 and 30 described above and insert member 50 positioned between them.

With the insert member 50' positioned in the mated openings 22' and 32', environmental contaminants, such as dirt, water and debris, are prevented from access into the housing 202 where they could affect the operation of the friction clutch assembly 212.

The shaft member 214 is rotatably supported in the housing 202 by bearing set member 230. Although only one bearing set 230 is shown, more than one set of bearings or stacked bearings can be utilized.

The friction clutch mechanism 212 includes an armature plate 232, a friction plate 234 and two annular rings of friction material 236, 238. The armature plate 232 is preferably made of a magnetically susceptible metal material, such as low carbon steel. The friction plate 234 is preferably made of a non-magnetically susceptible material, such as stainless steel.

The friction material 236, 238 can be any conventional friction materials used in friction clutches today, and can be complete rings, segments of rings, or simply pieces of friction material positioned generally where rings 236, 238 are shown in the drawings. The friction materials are fixedly attached to the two sides of the friction plate by, for example, bonding using a bonding agent.

The cover member 208 which preferably is made of a non-magnetically susceptible material, such as stainless steel, is connected directly to the pulley member 10' by the connecting pin members, such as fasteners or bolts 210. The ends of the fasteners can be threaded for mating with corresponding mating threads in openings 221 in the pulley member. Thus, when the pulley is rotated by an engine belt (not shown); the cover member 208 rotates at the same input speed.

The pulley member 10' is preferably made of a magnetically susceptible metal material, such as low carbon steel. This is the same as described above with respect to the pulley member 10. The pulley member rotates freely around bearings 240. Although the bearings can be of any type that will have sufficient durability and performance, a pair of stacked bearings 240 can be utilized, as shown in the drawings.

The friction clutch assembly is acutated by a solenoid assembly 250. The solenoid assembly includes a solenoid coil 252 which is positioned in the base member 206. The solenoid coil member comprises a donut-shaped coil of copper wires, while the solenoid housing is preferably made of a magnetically-susceptible material, such as low carbon steel. The solenoid coil member 252 is preferably potted in the base member 206.

A nut member 260 is threaded, or otherwise firmly fixed, on the end of the shaft member 214. The friction plate member 234 is connected, such as being keyed, to the nut member 260. As shown in FIG. 7, the nut member has a plurality of spline members 261 which fit within corresponding notches 235 in the center of the friction plate member 234. In this manner, the nut and friction plate members rotate with the shaft member 214. The nut member 260 and the shaft member 214 thinly clamp a stop member 270 and the bearing member 230 together. The shaft member 214 and all components fixed on it are positioned axially by the bearing member 230. The stop member 270 is preferably made of a non-magnetically susceptible material, such as stainless steel.

To fix the bearing member 230 in an axial position inside the housing 206, a wave spring member 280 and bearing retainer member 282 are utilized. The bearing retainer member 282 is threadedly affixed to the housing 206 as shown by reference number 284.

The stop member 270 is utilized to stop the axial movement of the friction plate member 234 when the solenoid assembly 250 is energized, as explained below. A return spring 290 is positioned between the nut member 260 and the friction plate member 234 and acts to return the friction plate member 234 to its mechanical disengaged position when the solenoid assembly 250 is actuated.

The solenoid coil 252 is electrically powered through a circuit board (not shown). Electrical leads and wires can be insert molded in the housing 206 in order to carry the electrical signals to the solenoid coil member 252. The circuit board further communicates with the electronic control unit (ECU) of the vehicle through the vehicle communication network such as a CAN network. The water pump assembly controller circuit board could also be positioned inside the housing 206, possibly having a donut shape.

Activation of the water pump is selected according to the cooling required for the engine. Sensors feed relevant data to the ECU which then sends a signal to the pump controller requesting that the pump be activated. The pump controller then engages the friction clutch which allows the impeller to be driven by the pulley.

When activation of the water pump is not needed, the friction clutch assembly is held in a disengaged position by the solenoid assembly 250. This is shown in FIG. 9. When the solenoid coil member 252 is electrically activated, a flux circuit 300 is created which acts to pull the armature plate 232 toward the solenoid coil member overcoming the force of the coil spring members 302. With the armature plate 232 pulled toward the solenoid, the return spring 290 holds the friction plate 234 against the stop member 270. In this condition, the friction materials on the friction plate 234 are not in contact with either the cover member 208 or the armature plate 232.

The number of coil springs 302 and their biasing force is determined according to the force needed in the assembly. Six coil springs 302 are shown in the drawings, but there can be more or less than this amount depending on the force needed.

In this deactivation mode of operation, there are air gaps on the exterior sides of the friction materials on the friction plate, and the input (pulley member) and output (shaft member) are disconnected. This eliminates any interaction, such as bearing drag between the input and output.

In order to create an appropriate flux circuit 300, the pulley member 10' has a plurality of openings which create air gaps. This is particularly shown in FIG. 7A, as well as FIG. 9. The openings created by aligned openings 22' and 32' in the cup members 20' and 30', respectively, essentially form an annular open ring. With the air gaps, the pulley member is, for electromagnetic purposes, essentially an outer annular ring and a separated annular inner ring. The size, shape and number of openings or slots is not critical, so long as they fulfill the purposes of creating a break in the magnetic flux.

The flux circuit 300 is shown in FIG. 9. It runs through the solenoid housing 206, the belt engaging portion 223 of the pulley member 10', outer annular ring portion of the pulley member, and then jumps to the armature plate member 232 and then back to the inner annular ring portion of the pulley member 10' where it returns to the solenoid housing. This circuit pulls the armature member tightly against the pulley member. In this condition, the water pump impeller 204 is not activated.

FIG. 8 depicts the situation where the solenoid assembly 250 is not activated. This is the "fail safe" condition. This causes the water pump to be driven by an engine belt and activated. In this situation, coil springs 302 force the armature member 232 in a direction away from the pulley member and away from the solenoid assembly. This causes the armature member 232 to contact the friction member 236 which in turn forces the friction member 238 to contact the inner surface 209 of the cover member 208. Since the armature member, pulley member and cover member are all fixed together, this causes the shaft member 214 and impeller member 204 to rotate at the same speed.

A path of torque transfer which mechanically rotates the shaft member is shown by arrows 320 in FIG. 8. In the engaged clutch, the friction plate member 234 is clamped between the cover member 208 and armature member 232 and torque is transferred through both sides of the friction plate. There also is a torque transfer path from the pulley member 10', through the fastener 210, the armature plate member 232, the friction plate member 234, the nut member 290 and to the shaft 214.

Figure 10:
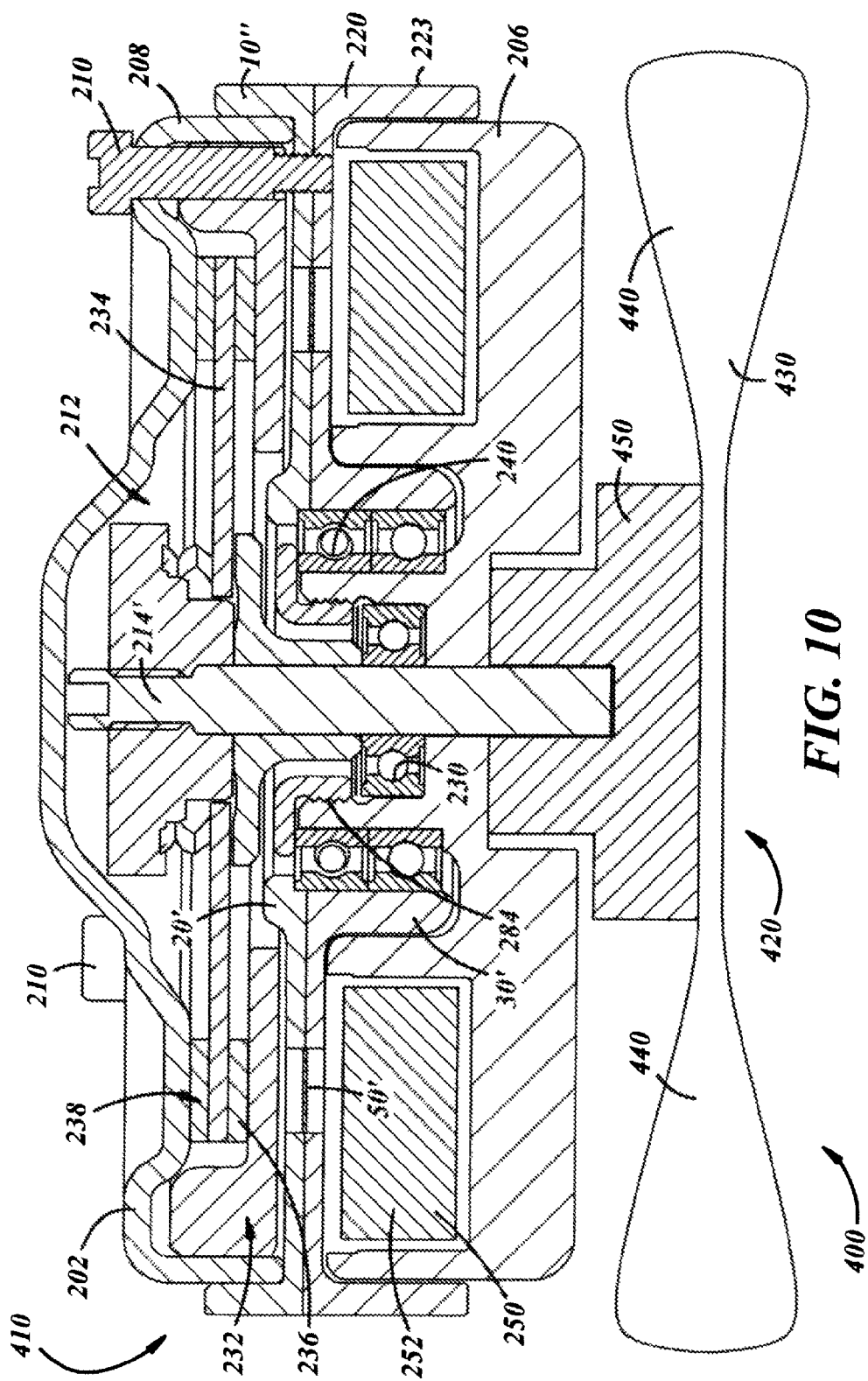
FIG. 10 schematically depicts an accessory drive for a cooling fan in which an embodiment of the present invention is utilized.

FIG. 10 schematically depicts the use of the inventive friction clutch for operating a cooling fan. The cooling fan accessory mechanism is referred to generally by the reference numeral 400.

The friction clutch mechanism 410 is substantially the same as the friction clutch mechanism described above which is utilized to selectively rotate a water pump impeller. In this embodiment, the friction clutch mechanism is utilized to rotate a cooling fan. The components which are the same are referred to by the same reference numerals as set forth in the other Figures. The main differences are that the shaft member 214', when activated, rotates a cooling fan assembly 420. The fan assembly 420 includes a cooling fan 430 with a number of blade members 440 and central hub member 450. The hub member 450 is securely attached to the shaft member 214', and the fan 430 is securely attached to the hub member 450, such that the fan and blades will rotate when the shaft member rotates and at the same speed. Any conventional means or mechanisms can be utilized to attach the components together so they all rotate together.

In addition, the pulley member 10" is the same as the pulley member 10' described above with respect to FIGS. 6, 7, 7A, 8 and 9.

The present water pump and cooling fan devices are designed to be spring engaged so the accessory device is powered in the event of a control failure such as a loss of electrical power. This is done to provide "Fail-Safe" functionality meaning that the device defaults to its "on" state when it is not powered. If the electrical system of the coolant pump were to fail, the solenoid would be de-energized allowing the coil springs to force the friction clutch assembly to become engaged. Therefore the pump would operate in mechanical mode with the impeller driven by the pulley member through the clutch assembly, thus preventing overheating.

While preferred embodiments of the present invention have been shown and described herein, numerous variations and alternative embodiments will occur to those skilled in the art. Accordingly, it is intended that the invention is not limited to the preferred embodiments described herein but instead limited to the terms of the appended claims.

What is claimed is:

1. A pulley comprising:
   a first metal cup member having a plurality of first openings;
   a second metal cup member having a plurality of second openings;
   said first and second openings being at least partly axially and radially aligned to create one or more overlap area where the first and second openings overlap;
   at least one non-magnetically susceptible insert member positioned between said first and second cup members;
   said at least one non-magnetically susceptible insert member covering said one or more overlap areas.

2. The pulley of claim 1, wherein said first and second metal cup members are formed of low carbon steel.

3. The pulley of claim 1, wherein said at least one non-magnetically susceptible insert member is made of a non-magnetic metal material.

4. The pulley of claim 3, wherein said non-magnetic metal material is stainless steel.

5. The pulley of claim 1, wherein said first and second metal cup members are fixedly bonded together.

6. The pulley of claim 5, wherein the first and second metal cup members are bonded together by a weld.

7. The pulley of claim 1, further comprising a hub member, said hub member being positioned at a central axis of said first and second metal cup members.

8. The pulley of claim 7, wherein said first and second metal cup members and said hub member are bonded together.

9. The pulley of claim 8, wherein a weld bonds the first and second metal CUP members and the hub member together.

10. The pulley of claim 1, wherein a plurality of recesses are provided around said first plurality of in said first metal cup member, and wherein said at least one non-magnetically susceptible insert member is received in said recesses.

11. The pulley of claim 1, further comprising first alignment members on said first metal cup member and second alignment members on said second metal cup member, said first and second alignment members engaging to align the first and second metal CUP members to a common rotational axis.

12. The pulley of claim 11, wherein said first alignment members comprise nub members and said second alignment members comprise sockets that receive the nub members.

13. A driven vehicle accessory comprising:
a shaft member that is rotatable about an axis;
a pulley that is rotatable about the axis;
an electronic clutch having an armature and an electromagnetic coil that is selectively operable for generating a magnetic field to move the armature between a first armature position and a second armature position, wherein the electronic clutch transmits rotary power between the pulley and the shaft member when the armature is in the first armature position, and wherein the electronic clutch does not transmit rotary power between the pulley and the shaft member when the armature is in the second armature position;
said pulley comprising:
a first metal cup member having a plurality of first openings;
a second metal cup member having a plurality of second openings;
said first and second openings being at least partly axially and radially aligned to create one or more overlap area where the first and second openings overlap;
at least one non-magnetically susceptible insert member positioned between said first and second cup members;
said at least one non-magnetically susceptible insert member covering said one or more overlap areas.

14. The driven vehicle accessory of claim 13, wherein said first and second metal cup members are made of a magnetically susceptible material and said at least one non-magnetically susceptible insert member is made of a stainless steel.

15. The driven vehicle accessory of claim 13, further comprising a hub member and wherein said first and second metal cup members and said hub member are welded together.

16. The driven vehicle accessory of claim 13, further comprising first alignment members on said first metal cup member and second alignment members on said second metal cup member, said first and second alignment members engaging to align the first and second metal CUP members to a common rotational axis.

17. The driven vehicle accessory of claim 13, wherein said first and second openings a) are positioned and sized relative to the electromagnetic coil and b) overlap to an extent where they cooperate to break any magnetic flux generated by the electromagnetic coil between portions of said pulley that are disposed radially outwardly of said first and second openings and portions of said pulley that are disposed radially inwardly of said first and second openings.

18. The driven vehicle accessory of claim 13, further comprising an impeller coupled to the shaft member for rotation therewith.

19. The driven vehicle accessory of claim 13, further comprising an axial flow fan coupled to the shaft member for rotation therewith.

* * * * *

UNITED STATES PATENT AND TRADEMARK OFFICE
CERTIFICATE OF CORRECTION

PATENT NO. : 9,453,571 B2  Page 1 of 1
APPLICATION NO. : 14/149713
DATED : September 27, 2016
INVENTOR(S) : Shiwei Qin et al.

It is certified that error appears in the above-identified patent and that said Letters Patent is hereby corrected as shown below:

In the Claims

Column 9, Claim 9, line 2    delete "CUP", insert --cup--

Column 9, Claim 10, line 5    after "provided", delete "around said first plurality of"

Column 9, Claim 11, line 12    delete "CUP", insert --cup--

Column 10, Claim 16, line 20    delete "CUP", insert --cup--

Signed and Sealed this
Twenty-seventh Day of December, 2016

Michelle K. Lee
*Director of the United States Patent and Trademark Office*